July 6, 1965 W. P. GINGRAS 3,192,801

PIVOTABLE AND INDEXABLE ARM DRILL

Filed March 22, 1962 2 Sheets-Sheet 1

INVENTOR

WILLIAM P. GINGRAS

BY Homer R. Montague

ATTORNEY

July 6, 1965 W. P. GINGRAS 3,192,801

PIVOTABLE AND INDEXABLE ARM DRILL

Filed March 22, 1962 2 Sheets-Sheet 2

INVENTOR

WILLIAM P. GINGRAS

BY Homer R. Montague

ATTORNEY

United States Patent Office 3,192,801
Patented July 6, 1965

3,192,801
PIVOTABLE AND INDEXABLE ARM DRILL
William P. Gingras, Rockville, Md., assignor to Jonker Business Machines, Inc., a corporation of Delaware
Filed Mar. 22, 1962, Ser. No. 181,759
5 Claims. (Cl. 77—5)

This invention pertains to information retrieval systems based on the use of superimposable cards dedicated to terms and the determination of coincidence of holes in said cards. These systems are also known as Peekaboo Systems. Commercially they are known as Termatrex systems.

In the Termatrex systems, an item of information is prepared for entry into the system by first indexing it by a number of terms taken from a vocabulary of terms. Each item of information is given an accession number.

Termatrex systems comprise of a number of cards each dedicated to a term. In total there will generally be a vocabulary of between 500 and 5000 terms. On each termcard there generally is one place dedicated to a document in the collection. Each document has the same position dedicated to it on each termcard.

Items of information are entered into a Termatrex system by selecting all of the termcards by which that item has been indexed and punching or drilling all of these cards at the position dedicated to the item of information. Terms can be words, classes, letters, numerals or any description or properties of any kind. The "vocabulary" of terms usually ranges between 500 and 5000.

The dedication of positions on the termcards to documents is usually, but not necessarily, based on an $x$–$y$ coordinate system.

A search is made by selecting a number of cards corresponding to the search terms, usually three to five cards, superimposing the same and scanning these for coinciding holes in all the superimposed cards. After that, these cards are placed back in the files.

There are a number of data input devices known in which the cards are superimposed in a device which will drill a hole at the required position in all cards simultaneously. An example is U.S. Patent 3,052,150 issued September 4, 1962. This device also features a lightbox for search purposes.

The object of the present invention is improvements in the device of said patent. Said device is based on a cross carriage able to move over said cards and a drill carriage able to move at right angles to said cross carriage. The drill is mounted on said drill carriage and is lowered by hand in a sleeve. As a result, the drillmotor has to be mounted in a sleeve and has to be small and cannot be adequately cooled. Also, use of two hands is required for normal operation of said device.

According to the present invention, the drillmotor is mounted directly on the Y axis carriage which rides on the X axis carriage, the total assembly of which is called an overarm. In order to bring the drill into engagement with the cards, the drill is placed and constrained at the proper position by detent devices and the overarm is lowered. This arrangement allows the use of a larger motor and ample cooling facilities as well as single handed operation.

Another aim of the invention is a provision to advance the drill automatically to the correct position for the subsequent drilling operations.

The manner in which these and other aims can be accomplished will be discussed with reference to the following figures.

Figure 1:
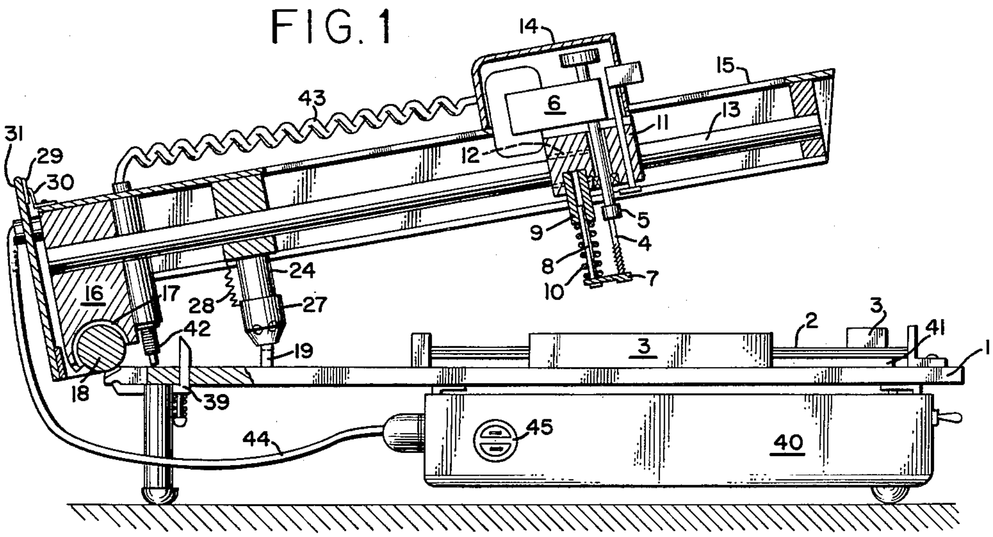
FIGURE 1 shows a side view of the device in normal position with cutaway area about the drill carriage.
Figure 2:
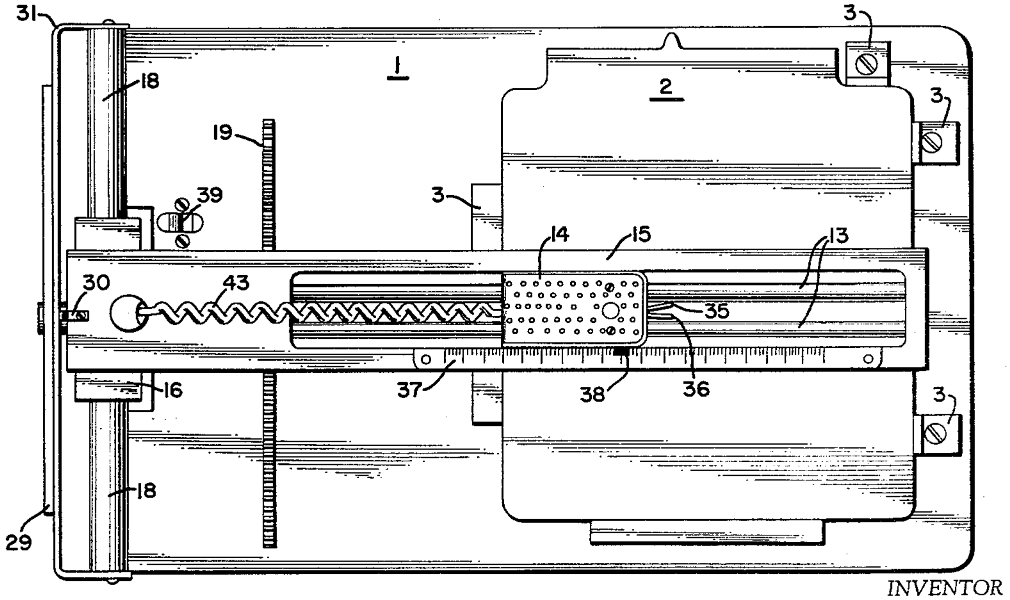
FIGURE 2 shows a top view of this device.

In FIGURES 1 and 2 a base plate 1 forms the main frame of a device. On this base plate 1 are stacked Termatrex cards 2 which are held in proper alignment by alignment blocks 3 attached to base plate 1.

A drill bit 4 is held in a chuck 5 which is powered and rotated by an electric motor 6. The tip of the drill bit 4 is accurately located and guided by a retractable pressure foot assembly consisting of a foot 7 fixed to guide rods 8 sliding in bushings 9. Compression springs 10 are coiled about the guide rods 8 which forces the foot 7 in a downward direction. The foot 7 contains a close fitting hole through which the drill bit 4 passes. When the drill bit 4 enters the Termatrex cards as described later, the pressure foot assembly assures accurate entry of the drill bit at the proper position and forces the Termatrex cards together for proper drilling results.

The drill bit motor 6 and pressure foot assembly are fixed to the Y axis carriage 11. In FIGURES 1 and 2 the Y axis carriage 11 moves in the Y direction (left and right) over the Termatrex cards 2. The Y axis carriage 11 is mounted on sliders 12 which may be, but are not limited to ball bushings. The sliders 12 travel along Y axis track rods 13. The motor 6 is protected by a cover 14. The Y axis track rods 13 are supported and housed by a cover 15. The Y axis track rods 13 are rigidly fixed to an X axis carriage 16. The X axis carriage 16 is mounted on sliders 17 which may be, but are not limited to ball bushings. The sliders 17 travel along X axis track rod 18. The X axis track rod 18 is fixed to the base plate 1. The entire assembly hereafter called the overarm consisting in part of Y axis track rods 13 and motor 6 housing 15 and X axis carriage 16 moves in the X axis direction over the Termatrex cards 2. The Y axis track rods 13 and X axis track rod 18 are located in planes which are at right angles to each other.

Figure 3:
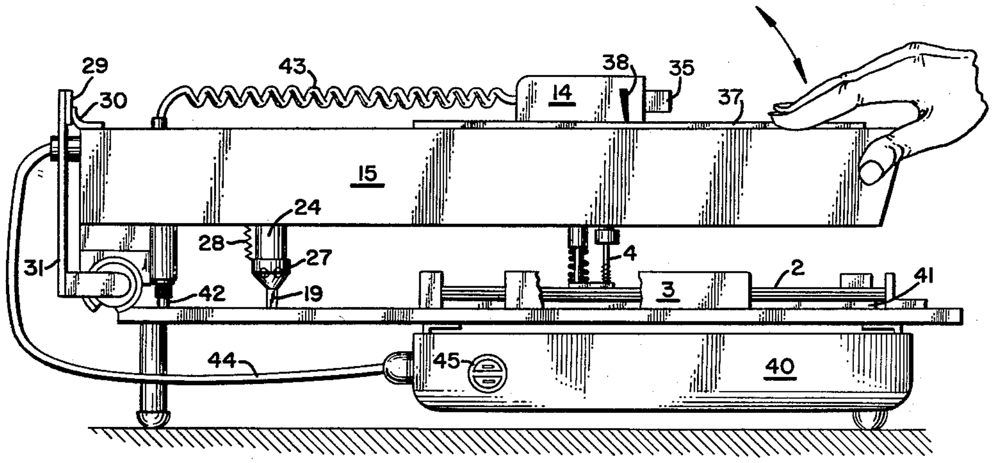
FIGURE 3 shows a side view of this device in the downward or drilling position.

Referring to FIGURE 3, the drill bit 4 enters the Termatrex cards 2 when the operator grasps the overarm and forces it downward. The resulting downward rotation movement is permitted by the rotating action of the X axis slider 17 about the X axis track rod 18. The center of the X axis track rod 18 forms the center of downward displacement of the drill bit 4 and is so placed with respect to the Termatrex cards that undesirable horizontal movement of the drill bit 4 within a thick Termatrex card stack 2 is held to a minimum. After the card drilling is completed, the operator's hand releases the overarm, which returns to the normal position shown in FIGURE 1.

Figure 4:
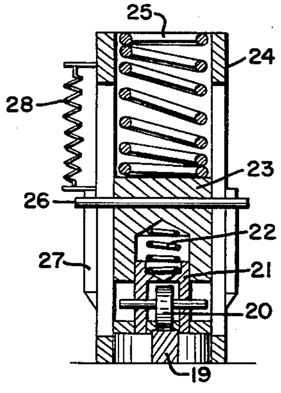
FIGURE 4 shows a side view of the spring detenting and one step advance device.
Figure 5:
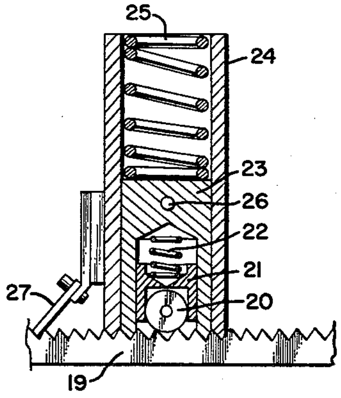
FIGURE 5 shows a front view of same.

The X axis spring and detent assembly shown in FIGURE 4 and FIGURE 5 provides return spring force for the overarm and provides coarse and fine drill location in the X axis direction. A detent bar 19 has an upper edge which is serrated with a number of equally spaced teeth which correspond to the distance between holes on the Termatrex matrix pattern. X axis drill location is determined by an operator who grasps the foremost portion of the overarm assembly and applies force in the left or right direction causing the entire overarm assembly including the X axis spring and detent assembly to move in the desired direction. The sliding action of the overarm assembly causes a coarse detent wheel 20 to roll along the detent bar 19. The coarse detent wheel 20 is constrained by an axle within an inner piston 21 which is forced downward by a spring 22. The inner piston 21 slides within an outer piston 23. The outer piston 23 slides within a cylinder 24. The outer piston 23 is forced downward by a spring 25 within the cylinder 24. A pin 26 fixed to the outer piston 23 travels in slots in the cylinder 24 which limits axial motion and prevents angular motion of the outer piston 23. Force of springs 22 and 25 tends to make the detent wheel 20 settle in the valleys of teeth on detent bar 19. When the detent wheel 20 is not in a valley of a tooth, a slight sideways force results which causes the entire overarm assembly to move in the X direction until the detent wheel 20 settles in the nearest adjacent valley of teeth on detent bar 19. This action which signals the completion of the coarse detenting action in the X direction can be sensed by the operator's hand.

The operator then forces the overarm assembly downward as shown in FIGURE 3. The cylinder 24 and the upper portion of the spring 25 which are fixed to the overarm assembly also move downward. The force of spring 25 on outer piston 23 increases. When the downward force on outer piston 23 exceeds the upper force contributed by spring 22 the outer piston moves downward. This downward motion continues until teeth which are part of the bottom edge of the outer piston 23 are engaged with the teeth on the detent bar 19. The teeth in the bottom part of the outer piston 23 and the top of detent bar 19 are so shaped that side force is developed if there is any remaining X axis misalignment. The tooth to tooth engagement forms a fine detenting action which is complete before the drill 4 enters the Termatrex card 2. The downward travel of the overarm assembly is regulated at the lower limit when the cylinder 24 touches the base plate 1. When the drilling is completed, the operator releases the overarm assembly which moves upward due to the force of spring 25. The upward travel of the overarm due to the lifting force of spring 25 is limited by pin 26 when it reaches the lower slot extremity in cylinder 24.

In item by item type of data entry in Termatrex cards the X axis drill position must be moved one station to the right after each hole is drilled. This action is accomplished automatically by a pawl 27 and spring 28. The pawl 27 pivots about pin 26 and tends to swing downward by the action of gravity and tension spring 28. When the overarm is in upward or normal position, outer piston 23 and pin 26 are also in the upward position and pawl 27 swings downward to the valley of a tooth in detent bar 19. When the overarm is forced downward outer piston 23 and pin 26 also move downward. The tip of pawl 27 forms a pivot point about which pin 26 must rotate as shown in FIGURE 5. The combined downward and pivoting action on pin 26 produces an X axis force to the right. Detent wheel 20 rolls to the right and settles in the valley of the next adjacent tooth on detent bar 19. The length of pawl 27 is regulated so that the downward travel limit of pin 26 terminates the force acting to the right due to pawl 27. When the overarm is released, the outer piston 23 and pawl 27 and pin 26 move upward, so that the tip of pawl 27 rises above the top of the tooth on detent bar 19. The action of gravity and spring 28 causes the tip of pawl 27 to move downward into the next adjacent tooth to the right on the detent bar 19 completing the cycle.

An operator determines the numerical X axis address by means of a scale 29 and pointer 30. The scale 29 contains divisions with numerals which correspond to each X axis address on a Termatrex card. The scale 29 is fixed to a scale holder 31 which maintains the scale rigid with respect to X axis motion but allows the scale 29 to pivot with the up and down motion of the overarm, permitting the pointer 30 which is fixed to the overarm to stay in close alignment with the divisions on scale 29.

Figure 6:
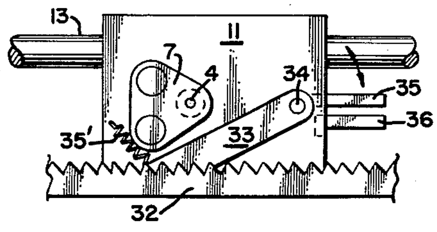
FIGURE 6 shows top view of the Y axis detenting device.

The motor carriage and drill assembly is properly positioned and held in the Y axis direction by the Y axis detent assembly, the bottom view of which is shown in FIGURE 6. Y axis detent bar 32 is similar in length, tooth shape and spacing to X axis detent bar 19. Detent bar 32 is fixed to Y axis housing 15, below and in a direction which is parallel to the motion of the drill carriage 11. Y axis detent pawl 33 pivots about pin 34. The tip of pawl 33 is serrated with teeth which match the teeth in detent bar 32. Pawl 33 is forced against detent bar 32 by means of the force exerted by spring 35'. The V shape of the teeth in pawl 33 and detent bar 32 is such that more intimate engagement of teeth produces more exact Y axis positioning. Pin 34 is fixed to a movable handle 35 on the upper side of the drill carriage 11. A fixed handle 36 is located close to movable handle 35. To move the motor and drill assembly from one position to another, the operator grasps the two handles 35 and 36 between thumb and forefinger and squeezes them together. The resultant force on movable handle 35 is transmitted through the pin 34 to pawl 33. Pawl 33 disengages from detent bar 32 leaving the Y axis drill carriage 12 free to move. The operator then moves the motor and drill assembly to the new Y axis position and releases finger pressure on handles 35 and 36. This allows pawl 33 to re-engage detent bar 32. The engagement of teeth between pawl 33 and detent bar 32 produces a fine detenting action which positions and holds the drill carriage 12 in proper location. An operator determines the numerical X axis address by means of a scale 37 and pointer 38 shown in FIGURES 2 and 3. Scale 37 contains divisions with numerals which correspond to each Y axis address on a Termatrex card. Scale 37 is fixed to Y axis housing 15. Pointer 38 which is fixed to drill carriage housing 14 is located to register closely with scale 37 so that an operator may view the numerical address of the Y axis position of the drill carriage.

The subject invention also embodies a means of readout of coincident holes when various Termatrex cards are stacked on base 1. To permit an operator to view the entire area of a Termatrex card, the overarm may be removed from the field of view. When the overarm is placed approximately at the middle of the Termatrex cards it may be rotated about X axis track rod 18 upward until Y axis track rod 13 is nearly vertical. At this point a notch near the base of X axis carriage 16 engages lever 39 constraining the overarm in the vertical position. The overarm returns to the normal position shown in FIGURE 1 when lever 39 is actuated. This disengages the lever 39 from the notch in the base of X axis carriage 16, permitting the overarm to freely rotate downward to its normal position. A light box 40 provides illumination beneath Termatrex cards for readout of coincident holes. The light box 40 contains electric lamps which provide light which penetrates upward through a translucent plastic sheet 41 fixed to base plate 1.

The drill motor 6 is automatically energized and deenergized by means of electric switch 42, retractable cord set 43, and flexible cord 44. When the overarm is moved downward for drilling, button actuated electric switch 42 fixed to X axis carriage 16 also moves downward. The button on the lower tip of switch 42 touches base plate 1 after sufficient travel. This button closes contacts within switch 42 which allows electric current to pass from cord 44 into cord 43 energizing electric motor 6. The electric motor powers the drill which drills the hole in Termatrex cards 2. When the overarm is released and returns to its normal position switch 42 moves upward allowing the button on the lower tip to move away from base plate 1. The electric contact within switch 42 reopens which de-energizes electric motor 6. Power input comes through plug connection 45 which connects internally within light box 40 to the lamps and to cord 44.

I claim:

1. An apparatus for the drilling of data-encoding holes in selected coordinate positions of superimposable record cards, comprising (a) a generally horizontal base plate having means thereon to position in flat stacked alignment a number of such record cards, (b) X-axis linear horizontal guide means secured to said base plate and extending parallel to one flat dimensional direction of the stacked cards, (c) an X-axis carriage mounted to slide along said X-axis guide means, (d) Y-axis linear guide means secured to said X-axis carriage, extending perpendicular to the lengthwise direction of said X-axis guide means, and bodily rotatable through a vertical arc about the lengthwise direction of said X-axis guide means, (e) a Y-axis carriage slidably mounted on said Y-axis guide means, and (f) a record-card drilling device carried by said Y-axis carriage in position to engage and to drill data-encoding holes in selected coordinate positions of the aligned record cards, as said Y-axis guide means is swung downward in its vertical arc.

2. Apparatus in accordance with claim 1, and cooperating detent formations carried by both of said guide means and their corresponding carriage, to establish a multiplicity of definite, equally-spaced rest positions of said carriages with reference to the margins of said base plate.

3. Apparatus in accordance with claim 1, in which said drilling device includes an electric drill drive motor, and an energizing circuit for said motor including a control switch mounted for operation automatically upon bodily rotation of said Y-axis guide means to a position approaching the horizontal.

4. Apparatus in accordance with claim 1, and cooperating detent formations carried by one of said guide means and its corresponding carriage, to establish a multiplicity of definite, equally-spaced rest positions of the last-named carriage with reference to the margins of said base plate.

5. Apparatus in accordance with claim 4, and means supported by one of said detent formations for indexing the corresponding carriage one detent-step along its guide means for each vertical swing cycle of movement of said Y-axis guide means.

References Cited by the Examiner

UNITED STATES PATENTS

| | | | |
|---|---|---|---|
| 1,674,669 | 6/28 | Stedman | 77—7 |
| 1,995,168 | 3/35 | Bronander | 144—92 |
| 2,588,087 | 3/52 | Conner et al. | 83—564 |
| 2,694,449 | 11/54 | Ruffin | 83—558 |
| 3,041,907 | 7/62 | Gallagher | 83—564 |
| 3,052,150 | 9/62 | Jonker | 77—5 |

FOREIGN PATENTS

| | | |
|---|---|---|
| 1,000,988 | 1/57 | Germany. |

WILLIAM W. DYER, Jr., *Primary Examiner.*

FRANK H. BRONAUGH, JOHN C. CHRISTIE, *Examiners.*